United States Patent
Lee et al.

(10) Patent No.: US 12,469,266 B2
(45) Date of Patent: Nov. 11, 2025

(54) ROBOT CLEANER AND CONTROL METHOD THEREOF

(71) Applicant: LG ELECTRONICS INC., Seoul (KR)

(72) Inventors: Changhyeon Lee, Seoul (KR); Kihong Park, Seoul (KR); Kahyung Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 405 days.

(21) Appl. No.: 18/011,028

(22) PCT Filed: Dec. 4, 2020

(86) PCT No.: PCT/KR2020/017643
§ 371 (c)(1),
(2) Date: Dec. 16, 2022

(87) PCT Pub. No.: WO2022/019399
PCT Pub. Date: Jan. 27, 2022

(65) Prior Publication Data
US 2023/0245465 A1    Aug. 3, 2023

(30) Foreign Application Priority Data

Jul. 22, 2020 (KR) .................. 10-2020-0090977

(51) Int. Cl.
*G06V 10/80* (2022.01)
*A47L 9/28* (2006.01)
(Continued)

(52) U.S. Cl.
CPC ............ *G06V 10/80* (2022.01); *A47L 9/2826* (2013.01); *A47L 9/2852* (2013.01);
(Continued)

(58) Field of Classification Search
CPC ........ G06V 10/80; G06V 10/30; G06V 20/58; A47L 9/2826; A47L 9/2852; A47L 2201/04; G01C 21/206
See application file for complete search history.

(56) References Cited

U.S. PATENT DOCUMENTS

| | | | |
|---|---|---|---|
| 9,965,865 B1* | 5/2018 | Agrawal | G06V 10/7747 |
| 2021/0183016 A1* | 6/2021 | Toyoura | G01S 7/4808 |
| 2022/0084225 A1* | 3/2022 | Kang | G01S 7/4808 |

FOREIGN PATENT DOCUMENTS

| | | | | |
|---|---|---|---|---|
| CN | 110622085 A | * | 12/2019 | G05D 1/0214 |
| JP | 2014-219721 | | 11/2014 | |

(Continued)

OTHER PUBLICATIONS

International Search Report dated Oct. 21, 2021 issued in Application No. PCT/KR2020/017643.
(Continued)

*Primary Examiner* — Casey L Kretzer
(74) *Attorney, Agent, or Firm* — KED & ASSOCIATES, LLP

(57) ABSTRACT

Provided according to one embodiment of the present invention is a method for controlling a robot cleaner, comprising: a map data collection step of collecting first information collected by photographing a cleaning target area by means of a depth camera and second information collected by photographing the cleaning target area by means of an IR sensor; a depth data filtering step of removing, from the first information, information which is determined to be noise when detecting obstacles; and a data restoration step of, if there is a lost part of the information on the obstacles by comparing the second information with the information that is determined to be noise and removed in the depth data filtering step, restoring the lost part. According to the present embodiment, it is possible to obtain effective obstacle infor-
(Continued)

mation by removing noise that is not removed despite filtering of the depth camera, so as to detect even thin obstacles.

16 Claims, 9 Drawing Sheets

(51) Int. Cl.
  *G01C 21/20* (2006.01)
  *G06V 10/30* (2022.01)
  *G06V 20/58* (2022.01)
(52) U.S. Cl.
  CPC ........... *G01C 21/206* (2013.01); *G06V 10/30* (2022.01); *G06V 20/58* (2022.01); *A47L 2201/04* (2013.01)

(56) References Cited

FOREIGN PATENT DOCUMENTS

| | | |
|---|---|---|
| KR | 10-2014-0119325 | 10/2014 |
| KR | 10-2015-0140380 | 12/2015 |
| KR | 10-2017-0061355 | 6/2017 |
| KR | 10-2018-0112623 | 10/2018 |
| KR | 10-1938668 | 1/2019 |
| KR | 10-2033143 | 10/2019 |
| WO | WO-2019044571 A1 * 3/2019 ............. G01S 17/89 |

OTHER PUBLICATIONS

Korean Office Action dated Oct. 29, 2021 issued in Application No. 10-2020-0090977.

* cited by examiner (a)

(b)

(c)

(a)

(b)

(c)

(d)

ROBOT CLEANER AND CONTROL METHOD THEREOF

CROSS-REFERENCE TO RELATED PATENT APPLICATIONS

This application is a U.S. National Stage Application under 35 U.S.C. § 371 of PCT Application No. PCT/KR2020/017643, filed Dec. 4, 2020, which claims priority to Korean Patent Application No. 10-2020-0090977, filed Jul. 22, 2020, whose entire disclosures are hereby incorporated by reference.

TECHNICAL FIELD

The present disclosure relates to a method for controlling a robot cleaner.

BACKGROUND ART

Generally, humans clean their living spaces for hygiene and cleanliness. There are many reasons for such cleaning. For example, humans may perform cleaning to protect their bodies from disease or to prevent damage to their respiratory organs such as a bronchus, and may also clean their spaces to improve the quality of life by staying in a clean space.

Dust or foreign materials may settle to the floor of a room due to gravity. Therefore, in order to clean the room, people tend to strain their backs or joints because they have to perform cleaning while bending over or sitting down.

To this end, cleaners that assist people in cleaning have recently appeared. The cleaners can be roughly classified into a stick-type cleaner, a bar-type cleaner, a robot cleaner, etc.

The robot cleaner from among the above cleaners may clean a specific space such as a home or an office instead of a user. Generally, the robot cleaner may clean a target area to be cleaned by sucking dust from the target area.

Korean Patent Laid-Open Publication No. 10-2013-0091879 has disclosed a robot cleaner that executes a process of generating a map including information about a target space to be cleaned, a process of setting a cleaning route using the map, and a process of performing cleaning of the target space using the cleaning route. However, this robot cleaner is unable to perform functions utilizing information about the floor, such as a function of performing cleaning by analyzing the shape or depth of the floor surface.

DISCLOSURE

Technical Problem

An object of the present disclosure is to provide a robot cleaner capable of restoring information about actual obstacles even when the actual obstacle information is lost through a filtering process for removing noise, and a method for controlling the same.

Another object of the present disclosure is to provide a robot cleaner capable of securing desired detection performance by restoring obstacle information through a depth camera and an infrared (IR) sensor, and a method for controlling the same.

In particular, there is a high possibility that, even if the presence of thin wires or the like is detected by a depth camera, information about the presence of thin wires will be unexpectedly removed by a filtering process, so that the robot cleaner is unable to recognize the presence of the thin wires. In order to address this issue, the robot cleaner and a method for controlling the same according to the present disclosure can restore the removed obstacle information based on information collected through the IR sensor, so that the robot cleaner can obtain information on real obstacles while removing noise.

Technical Solutions

As an example for solving the above-described issues, the robot cleaner according to the present disclosure may remove noise by filtering raw data. The robot cleaner according to the present disclosure may extract feature points by image processing of infrared (IR) raw data, and may perform depth filtering on a portion determined to be lines and planes. In this case, if occurrence of lost data is determined, the robot cleaner can restore the lost data.

In accordance with an aspect of the present disclosure, a method for controlling a robot cleaner may include: a map data collecting step of collecting first information acquired when a cleaning target area is photographed by a depth camera and second information acquired when a cleaning target area is photographed by an infrared (IR) sensor; a depth data filtering step of removing, from the first information, information determined to be noise when detecting obstacles; and a data restoration step of determining whether there is a lost part in information about obstacles by comparing the second information with the information that was determined to be noise and removed in the depth data filtering step, and restoring the lost part when the lost part is present in the information about obstacles.

The map data collecting step may include collecting the first information and the second information independently of each other.

The depth data filtering step may include removing information determined to be noise from the first information using at least one filtering method.

The depth data filtering step may include an intensity comparison step in which, when an intensity of information received by each pixel of the depth camera is equal to or less than a predetermined value, the received information is determined to be noise and removed.

The depth data filtering step may include a distance comparison step in which, if a difference between an actual position and a reference position corresponding to a distance value where each pixel of the depth camera is detected is a predetermined distance or more, the corresponding information is determined to be noise and removed.

The depth data filtering step may further include a smoothing step of correcting information of each pixel to an average value of information of pixels not corresponding to noise from among information of peripheral pixels located around each pixel.

The depth data filtering step may further include a flying pixel removal step in which, if a distance between each pixel and peripheral pixels thereof is smaller than a predetermined distance, the corresponding information is determined to be valid data.

In the flying pixel removal step, the peripheral pixels may be pixels that are located closest to each pixel in all directions from each pixel.

The flying pixel removal step may include: if a distance between each pixel and at least five peripheral pixels from among the peripheral pixels is smaller than a predetermined distance, determining the corresponding information to be valid data.

The second information is acquired by: extracting feature points from an image photographed by the IR sensor; determining corners by interconnecting the feature points; and determining information about obstacles by interconnecting corners when the presence of the corners is decided.

Feature points contained in a region partitioned by the corners may be determined to be information about obstacles, and feature points located outside the region partitioned by the corners may be determined to be noise and removed.

The method may further include performing the data restoration step after execution of the depth data filtering step.

The data restoration step may include, when information determined to be noise is removed from the first information, determining whether a discontinuous part is present in the information determined to be noise, and when the presence of the discontinuous part is determined, determining the presence of a lost part in the information determined to be noise.

The data restoration step may include: when the presence of the discontinuous part is determined, determining whether the discontinuous part from among the second information corresponds to obstacles.

The data restoration step may include: when the discontinuous part from among the second information corresponds to obstacles, restoring information corresponding to the discontinuous part.

In accordance with another aspect of the present disclosure, a robot cleaner may include: a main body configured to form an exterior appearance thereof; a suction unit coupled to the main body to clean a floor surface; a drive unit coupled to the main body, and provided to allow the main body to be movable; a sensing unit disposed in the main body, and configured to include a depth camera that calculates a near-field or far-field distance from a target object to be photographed and an infrared (IR) sensor that captures an image using infrared rays; and a controller configured to process information collected by the sensing unit, wherein information determined to be noise is removed from first information collected through the depth camera, and if there is a lost part in information about obstacles by comparing the removed information determined to be noise with second information collected through the IR sensor, the lost part is restored.

Advantageous Effects

As is apparent from the above description, the robot cleaner and a method for controlling the same according to the embodiments of the present disclosure can improve the capability to detect obstacles by restoring data of a thin obstacle.

The robot cleaner and a method for controlling the same according to the embodiments of the present disclosure can remove noise that was not removed through the filtering step of depth data based on information acquired through the IR sensor.

BEST MODE

Hereinafter, embodiments of the present disclosure will be described with reference to the accompanying drawings. The following detailed description is provided to aid in a comprehensive understanding of the methods, apparatuses, and/or systems described herein. However, this is merely an example, and the present disclosure is not limited thereto.

In describing the embodiments of the present disclosure, a detailed description of known technologies related to the present disclosure will be omitted when it may make the subject matter of the present disclosure rather unclear. Furthermore, the terms as used herein are defined by taking functions of the invention into account and can be changed according to the custom or intention of users or operators. Therefore, the definitions should be made based on the contents throughout this specification. The terminology used in the detailed description is for the purpose of describing particular embodiments only and is not limiting. A singular representation may include a plural representation unless it represents a definitely different meaning from the context. Terms such as "include" or "has" are used herein and should be understood that they are intended to indicate existence of several components, functions or steps, disclosed in the specification, and it is also understood that greater or fewer components, functions, or steps may likewise be utilized.

Figure 1:
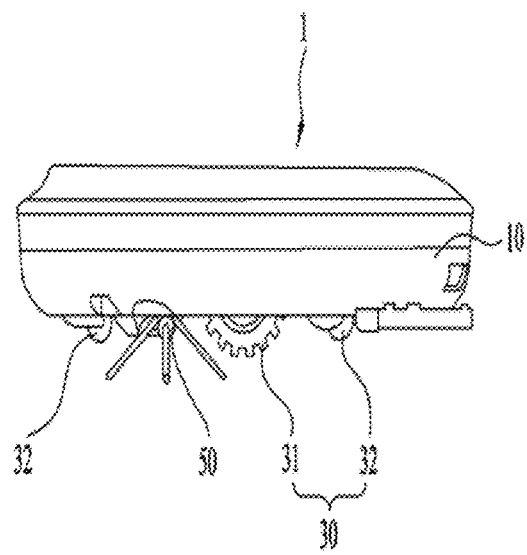
FIG. 1 is a view illustrating a robot cleaner according to an embodiment of the present disclosure.
Figure 2:
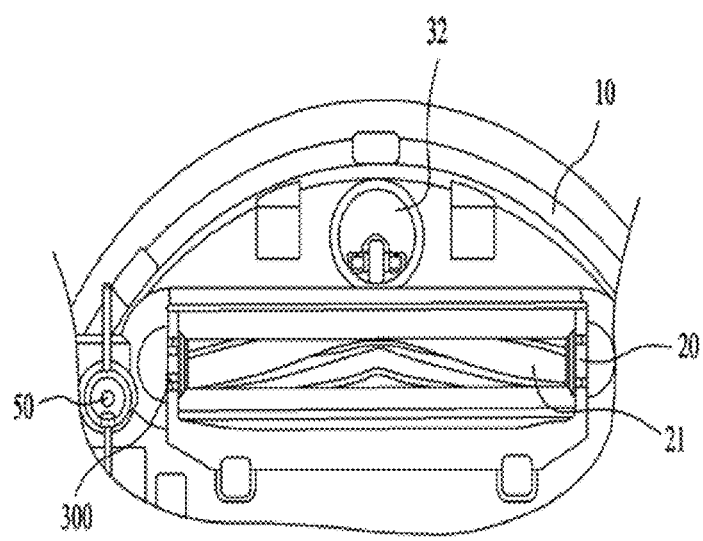
FIG. 2 is a view illustrating a portion of a bottom surface of a robot cleaner according to an embodiment of the present disclosure.
Figure 3:
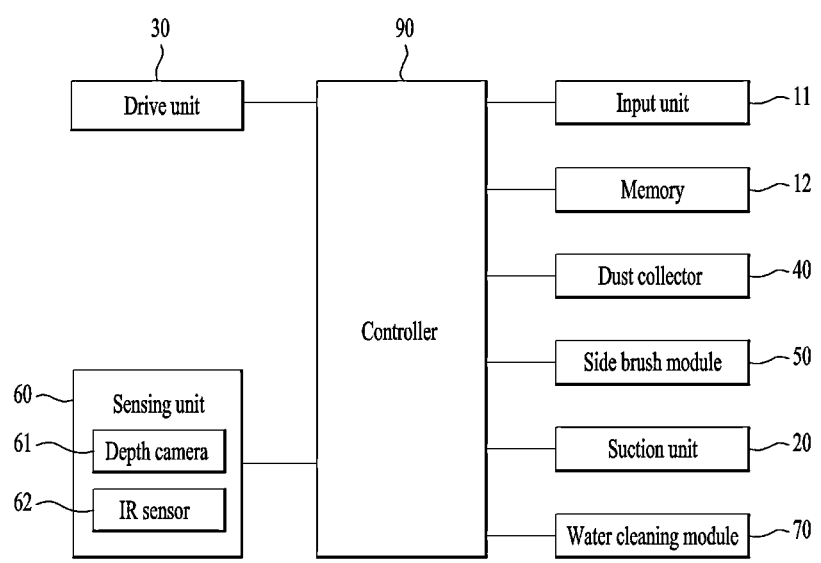
FIG. 3 is a block diagram showing a configuration of a robot cleaner according to an embodiment of the present disclosure.

FIG. 1 is a view illustrating a robot cleaner 1 according to an embodiment of the present disclosure. FIG. 2 is a view illustrating a portion of a bottom surface of the robot cleaner 1 according to an embodiment of the present disclosure. FIG. 3 is a block diagram showing a configuration of the robot cleaner 1 according to an embodiment of the present disclosure.

Referring to FIGS. 1 to 3, the robot cleaner 1 may perform a function of cleaning a floor while autonomously traveling in a predetermined area. Here, cleaning of the floor may include a step of suctioning dust (including foreign substances) from the floor or a step of mopping (or wiping) the floor.

The robot cleaner 1 may include a main body 10, a suction unit 20, a sensing unit 60, and a dust collector 40.

The main body 10 may form an exterior appearance of the robot cleaner 1. Various electronic components may be provided in the main body 10 so that the robot cleaner can operate.

The main body 10 may include an input unit 11 capable of receiving a command from a user.

The main body 10 may include a controller 90 for controlling the robot cleaner 1, and a drive unit 30 for driving the robot cleaner 1. The robot cleaner 1 can move or rotate in all directions (including front, rear, left and right directions) by the drive unit 30.

The drive unit 30 may include main wheels 31 and an auxiliary wheel 32.

The main wheels 31 may be respectively provided to both sides of the main body 10, and may be configured to be rotatable in one direction or another direction according to a control signal from the controller. The main wheels 31 may be configured to be driven independently of each other. For example, the respective main wheels 31 may be driven by different motors.

The auxiliary wheel 32 may support the main body 10 together with the main wheels 31, and may assist driving of the robot cleaner 1 by the main wheel 31. The auxiliary wheel 32 may also be provided in the suction unit 20 to be described later.

As described above, since the controller controls driving of the drive unit 30, the robot cleaner 1 can autonomously move on the floor.

A battery (not shown) for supplying power to the robot cleaner 1 is mounted on the main body 10. The battery is provided to be rechargeable, and may be detachably coupled to one side of the main body 10.

The suction unit 20 is provided at one side of the main body 10 to suction air containing dust.

The suction unit 20 may be detachably coupled to the main body 10 or may be integrally formed with the main body 10. When the suction unit 20 is separated from the main body 10, a water cleaning module 70 may be detachably coupled to the main body 10 by replacing the separated suction unit 20. Therefore, when the user wants to remove dust from the floor, the user can mount the suction unit 20 to the main body 10, and when the user wants to wipe the floor, the user can mount the water cleaning module to the main body 10.

However, the scope or spirit of the present disclosure is not limited thereto, and the robot cleaner according to an embodiment may have a shape in which both the suction unit 20 and the water cleaning module 70 are integrally formed.

A dust collector 40 may provide suction force to suction dust from the suction unit 20. The dust collector 40 may serve to separate dust from the suctioned air, store the dust, and discharge clean air to the outside of the robot cleaner again. The suction force of the suction unit 20 may increase or decrease according to the control of the controller. Specifically, the suction force of the suction unit 20 can be adjusted based on information about the floor surface on which the robot cleaner travels.

The dust collector 40 may include a drive motor (not shown). Negative pressure may occur in the robot cleaner through the drive motor provided in the dust collector 40, so that dust, foreign substances, and the like can be introduced into the robot cleaner.

An agitator 21 may be provided in the suction unit 20. It may be difficult to remove dust only with suction force of the dust collector 40 because of heavy weight of dust or the type of dust. Therefore, the agitator 21 may be provided to effectively remove dust.

Specifically, the agitator 21 may scatter dust on the floor by rotating on the floor surface. When the dust is scattered, the dust can be easily introduced into the robot cleaner by the suction force of the dust collector 40.

The operation of the agitator 21 may be controlled through an agitating motor (not shown) disposed in the suction unit 20. The degree of rotation of the agitator 21 may vary depending on the type and material of the floor surface.

A sensing unit 60 may be disposed in the main body 10. As shown, the sensing unit 60 may be disposed at one side of the main body 10 in which the suction unit 20 is located. That is, the sensing unit 60 may be disposed at a front side of the main body 10. This is because the robot cleaner 1 can prevent collision with obstacles while moving on the floor.

The sensing unit 60 may be provided to additionally perform other sensing functions other than the above sensing function.

The sensing unit 60 may include a camera. In this case, the camera may refer to a two-dimensional (2D) camera sensor. A camera may be provided at one side of the robot cleaner to obtain image information related to the surroundings of the main body during movement of the robot cleaner.

The camera may convert an image received from an image sensor provided therein into image data having a predetermined format. The generated image data may be stored in the memory 12.

The sensing unit 60 may include a depth camera for calculating a near-field or far-field distance between the robot cleaner and a target object to be photographed, and an IR sensor for capturing an image of the cleaning target area using infrared rays.

Specifically, the depth camera may capture a 2D image related to the surroundings of the main body, and may generate a plurality of 3D coordinate information corresponding to the captured 2D image.

In one embodiment, the depth camera may include a light source for emitting light and a sensor for receiving light emitted from the light source, and may measure a distance between the robot cleaner and a target object to be photographed by analyzing an image received from the sensor. The 3D camera sensor may be a time of flight (TOF) 3D camera sensor. In this case, each of the light source and the sensor may be provided in plural.

In another embodiment, the depth camera may include not only the sensor, but also a light source for radiating an infrared pattern. That is, the depth camera may further include an infrared pattern emitter. The sensor may measure the distance between the robot cleaner and the target object to be photographed by capturing a shape formed when the infrared pattern radiated from the infrared pattern emitter is projected onto the target object to be photographed. The 3D camera sensor may be an IR (Infrared) 3D camera sensor.

In another embodiment, the depth camera may be implemented as a stereo vision camera, which includes two or more cameras that acquire conventional 2D images, combines two or more images acquired from the two or more cameras, and thus generates 3D coordinate information.

However, according to the present disclosure, the depth camera is preferably a ToF camera.

Specifically, the depth camera may include a plurality of light sources and a plurality of light receivers. Each light receiver may be represented by a 'pixel'.

The robot cleaner 1 may include a side brush module 50. The side brush module 50 may scatter dust on the floor surface in the same manner as the agitator 21 described above.

The side brush module 50 may be coupled to the main body 10. If necessary, a plurality of side brush modules 50 may be provided in the main body 10.

In addition, the side brush module 50 is preferably located adjacent to the suction unit 20 as shown in FIG. 2.

Scattering the dust on the floor aids in efficient removal of the dust. Therefore, when the side brush module 50 is located far from the suction unit 20, the cleaning efficiency cannot be significantly affected by the side brush module 50, so that it is undesirable that the side brush module 50 be located far from the suction unit 20.

Figure 4:
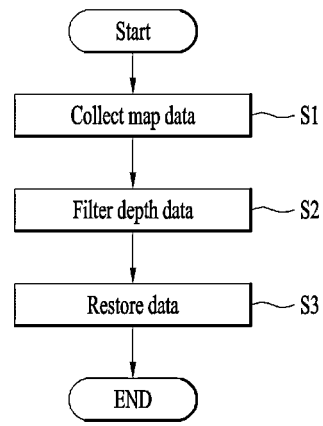
FIG. 4 is a flowchart illustrating a method for controlling a robot cleaner according to an embodiment of the present disclosure.

FIG. 4 is a flowchart illustrating a method for controlling the robot cleaner according to an embodiment of the present disclosure.

Referring to FIG. 3, the method for controlling the robot cleaner according to one embodiment may include a map data collecting step (S1), a depth data filtering step (S2), and a data restoration step (S3).

The map data collecting step (S1) may include collecting first information by photographing the cleaning target area using the depth camera, and collecting second information by photographing the cleaning target area using the IR sensor.

Specifically, the depth camera may acquire, from the respective pixels, information corresponding to each point of a target area to be photographed. In addition, the IR sensor may acquire image information of the target area to be photographed by capturing the cleaning target area to be cleaned using infrared rays.

In the map data collecting step S1, the first information and the second information may be collected independently of each other. That is, the first information and the second information may be collected at the same time or at different times. That is, the depth camera 61 and the IR sensor 62 may be controlled independently of each other. However, it is preferable that the depth camera 61 and the IR sensor 62 simultaneously collect information about the target area to be photographed.

Since the robot cleaner collects information while moving in the cleaning target area to be cleaned, the task of simultaneously collecting the first information and the second information may make it easy to compare two or more regions to be photographed with each other.

The depth data filtering step S2 may refer to a step of removing information determined to be noise when an obstacle is detected from the first information.

Since the first information refers to information that is generated when the depth camera captures the cleaning target area, noise may inevitably occur. In order to obtain a realistic map, it is desirable that noise be removed from the collected information.

A method for determining noise among the collected information will be described later.

In the data restoration step S3, information determined to be noise in the depth data filtering step S2 is compared with the second information collected through the IR sensor, and if there is a lost part among the information on the obstacles, the lost part can be restored.

Specifically, the first information may include information about obstacles, walls, and the like. The first information may include information about shapes and locations of obstacles and walls.

Information collected by the depth camera may include noise. Therefore, it is possible to collect information with high accuracy by detecting and deleting noise in a manner to be described later or in a manner that is easy for a person skilled in the art.

A process of removing noise may be performed according to a predetermined criterion. However, unexpectedly, at least some of the information corresponding to obstacles may be determined to be noise and deleted.

Not recognizing the presence of obstacles may act as a disadvantage of the robot cleaner. Therefore, whether the information determined to be noise is actual noise or information on the actual obstacle should be reviewed once again. If the information on the actual obstacle is determined, this information should be restored.

That is, the data restoration step S3 is a step for obtaining a more accurate map to facilitate stable driving of the robot cleaner.

Figure 5:
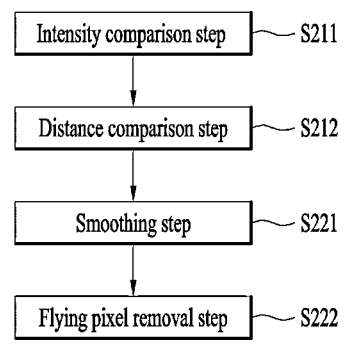
FIG. 5 is a flowchart illustrating a step of filtering depth data of a robot cleaner according to an embodiment of the present disclosure.

FIG. 5 is a flowchart illustrating the step (S2) of filtering depth data of the robot cleaner according to an embodiment of the present disclosure.

Referring to FIG. 5, the depth data filtering step S2 may include at least one of an intensity comparison step S211, a distance comparison step S212, a smoothing step S221, and a flying pixel removal step S222.

In the intensity comparison step S211, when the intensity of data received from each pixel of the depth camera is equal to or less than a predetermined value, information received from the corresponding pixel is determined to be noise and removed.

Information received by the depth camera 61 may include various types of information. For example, information collected from each pixel may include the location of a target area, received information, signal intensity, or the like.

If the intensity of information received by the depth camera 61 is low, it is difficult to determine that the information is normally received, so it is likely to be a noise signal or noisy information. Therefore, when information is received with the intensity lower than a predetermined value, it is preferable that the received information be determined to be noise and removed.

The depth data filtering step S2 may include a distance comparison step S212. In the distance comparison step S212, when a difference between an actual position and a reference position corresponding to a distance value where each pixel of the depth camera is detected is a predetermined distance or more, this difference in position is determined to be noise and removed.

Specifically, the distance comparison step S212 may compare position information corresponding to a distance value detected by each pixel with position information of each pixel. Here, if a difference in such position information is a predetermined distance or more, the value of the corresponding pixel is deleted.

For example, a pixel called 'A' may receive information of a point (x1, y1) located at a distance of B. At this time, there may occur a case in which the pixel called 'A' recognizes information of the corresponding area to be a distance of C. Assuming that the position corresponding to the distance of C is denoted by (x2, y2), if a difference between the distance 'B' and the distance 'C' is a predetermined value or more, the corresponding information may be determined to be noise.

In each of the intensity comparison step S211 and the distance comparison step S212, a predetermined value may be set differently according to performance of the depth camera 61 or the quality required in the product.

In addition, the intensity comparison step S211 and the distance comparison step S212 may be performed prior to the smoothing step S221 and the flying pixel removal step S222.

Although FIG. 5 shows that the distance comparison step S212 is performed after execution of the intensity comparison step S211 for convenience of description, the scope or spirit of the present disclosure is not limited thereto, it should be noted that the distance comparison step S212 can also be performed prior to the intensity comparison step S211.

That is, it should be noted that the order of the distance comparison step S212 and the intensity comparison step S211 is not fixed but is variable.

The depth data filtering step S2 may include the smoothing step S221. The smoothing step S221 is a step of correcting data such that respective pixels of the depth camera can be smoothly connected to each other.

The depth data filtering step S2 may include the smoothing step (S221) in which information of each pixel is corrected using an average value of information of some pixels not corresponding to noise from among information of pixels (i.e., peripheral pixels) located around each pixel.

Specifically, the smoothing step S221 refers to a step in which information of each pixel is corrected to an average value of the remaining pixels other than some pixels receiving information determined to be noise, from among values of peripheral pixels of each pixel.

The depth data filtering step S2 may include a flying pixel removal step S222. In the flying pixel removal step S222, when the distance between each pixel and peripheral pixels is smaller than a predetermined distance, data of the corresponding pixel can be determined to be valid data.

In the smoothing step S221 and the flying pixel removal step S222, the peripheral pixels may refer to pixels located closest to each pixel in all directions from each pixel. In other words, eight pixels may be located around one pixel other than the outermost pixel.

In the case where information of a pixel receiving information determined to be noise among values of peripheral pixels is also utilized, it is difficult to smooth information of obstacles. Therefore, information values of the respective pixels can be adjusted to an average value of the remaining pixels other than some pixels receiving information determined to be noise.

In the flying pixel removal step S222, when a distance value between each pixel and each peripheral pixel is equal to or less than a predetermined value, the corresponding distance value may be determined to be valid data. However, the process of determining such valid data may include not only a case in which the distance between each pixel and all peripheral pixels thereof is measured to be a predetermined value or less, but also the other case in which the distance between each pixel and at least five peripheral pixels is measured to be a predetermined value or less.

This is because some errors may occur in the depth camera 61. Therefore, in order to collect valid or effective data while increasing the reliability of data, when each pixel is spaced apart from at least five peripheral pixels (corresponding to a majority of 8 peripheral pixels) from among eight peripheral pixels of each pixel by a predetermined distance or less, data of the corresponding pixel may be determined to be valid data, so that the data of the corresponding pixel may not be removed.

In the depth data filtering step S2, information determined to be noise may be removed from the first information by using at least one filtering method. Through the depth data filtering step S2, it is possible to obtain accurate information about obstacles.

Figure 6:
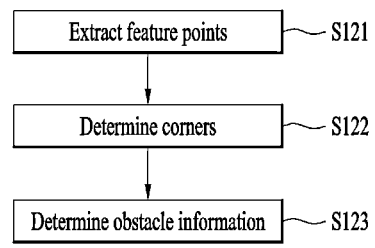
FIG. 6 is a flowchart illustrating a method for collecting second information according to an embodiment of the present disclosure.
Figure 7:
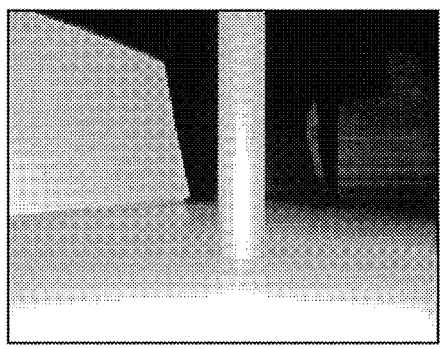
FIG. 7 (a) to (c) are views illustrating examples of a method for collecting second information according to an embodiment of the present disclosure.
Figure 7:
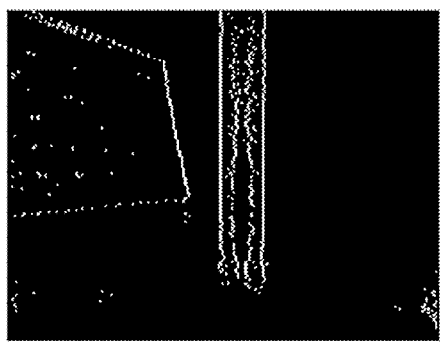
Figure 7:
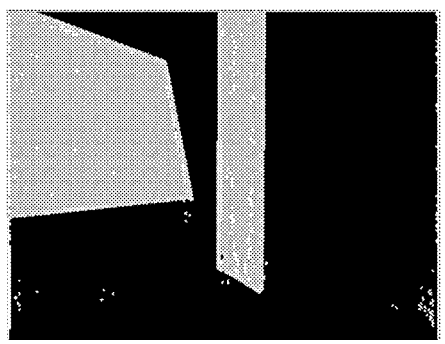

FIG. 6 is a flowchart illustrating a method for collecting second information according to an embodiment of the present disclosure. FIG. 7 is a view illustrating examples of a method for collecting second information according to an embodiment of the present disclosure.

Specifically, FIG. 7(a) is a diagram illustrating a method for collecting image information through the IR sensor, FIG. 7(b) is a diagram illustrating a method for deriving feature points through collected image information, and FIG. 7(c) is a diagram illustrating a method for determining obstacle information by interconnecting the derived feature points.

Referring to FIGS. 6 and 7, the map data collecting step S1 may include a feature point extracting step S121, an edge determining step S122, and an obstacle information determining step S123.

Specifically, the IR sensor may capture a target area to be photographed within the cleaning target area using infrared rays. Feature points may be extracted based on image information photographed through the IR sensor.

The feature point may refer to a point such as an edge of an object. However, the IR sensor may also include noise information. Accordingly, it is necessary to remove noise information.

The controller 90 may determine a line formed when feature points are interconnected to be an edge (or a corner). Also, planes formed by edges (or corners) can be determined to be obstacles.

Specifically, feature points located within the region partitioned by the edges (or corners) may be determined to be obstacle information, and feature points located outside the region partitioned by the edges may be determined to be noise and deleted.

That is, a method for forming the second information is as follows. First, feature points may be extracted from an image captured by the IR sensor, and the feature points may be interconnected to determine the presence or absence of corners. Thereafter, when the presence of corners is determined, the corners are connected to each other, so that the presence or absence of obstacles can be determined based on the resultant corner information, resulting in formation of the second information.

Figure 8:
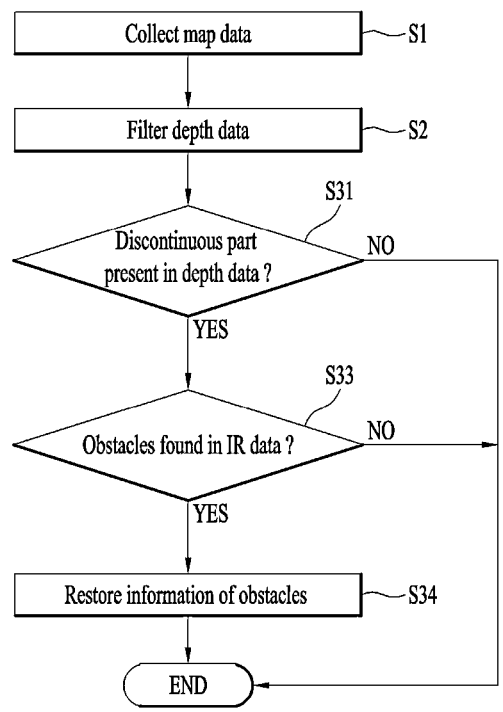
FIG. 8 is a flowchart illustrating a step of restoring data according to an embodiment of the present disclosure.
Figure 9:
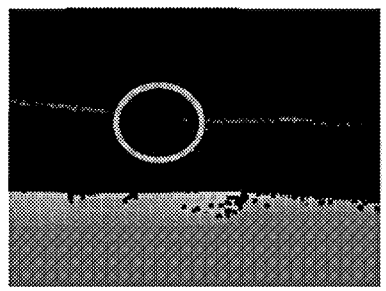
FIG. 9 (a) to (d) are views illustrating examples of a step of restoring data according to an embodiment of the present disclosure.
Figure 9:
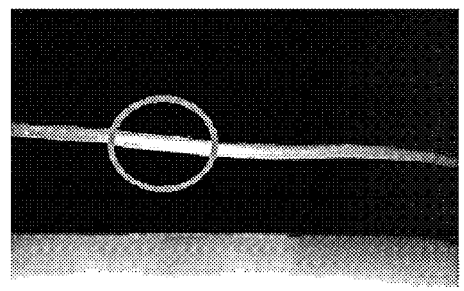
Figure 9:
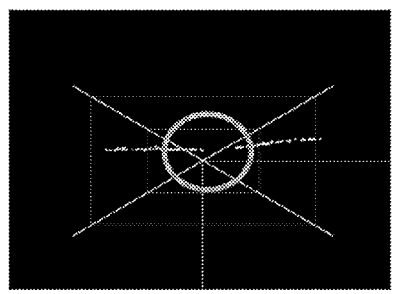
Figure 9:
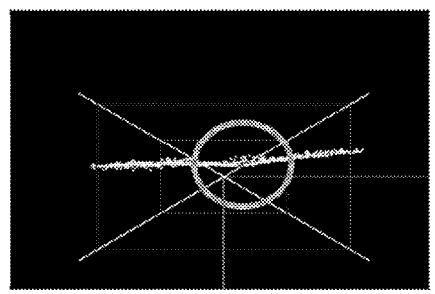

FIG. 8 is a flowchart illustrating the step of restoring data according to an embodiment of the present disclosure. FIG. 9 is a view illustrating examples of the step of restoring data according to an embodiment of the present disclosure.

Specifically, FIG. 9(a) is a view illustrating that a lost part appears through data filtering in the first information captured by the depth camera, and FIG. 9(b) is a view illustrating that obstacle information is determined through the IR sensor. FIGS. 9(c) and 9(d) show that a lost part of depth data is restored.

Referring to FIGS. 8 and 9, after the map data collecting step S1 and the depth data filtering step S2 are performed, the data restoration step S3 may be performed.

After the depth data filtering step S2 is performed, the robot cleaner may determine whether there is a discontinuous part in depth data (S31). The fact that there is a discontinuous part in the depth data obtained when noise information was removed from the first information may mean that information about obstacles was removed in the depth data filtering step S2.

In other words, since information on obstacles may be lost in the depth data filtering step S2, the robot cleaner cannot obtain accurate obstacle information using only the depth data.

If there is no discontinuous part in the depth data, this means that information about obstacles was not removed in the depth data filtering step S2, so that the data restoration step S3 may not be performed.

If there is a discontinuous part in the depth data, the robot cleaner may further perform a step of determining whether the lost part indicates an obstacle.

Specifically, since it is preferable that the first information and the second information be collected at the same time, the robot cleaner can determine whether an obstacle was actually disposed in the lost part by comparing the depth data with the IR data.

That is, the robot cleaner may compare the second information with information from which noise was removed from among the first information, and may determine whether the lost part was determined to be obstacle(s) by the IR sensor (S33).

The robot cleaner may compare the second information with depth data corresponding to information from which noise was removed from among the first information. If the lost part does not correspond to obstacles, the data restoration step S3 may not be performed.

The robot cleaner may compare the second information with depth data corresponding to information from which noise was removed from among the first information. If the lost part indicates obstacles, the robot cleaner can restore information corresponding to obstacles from among the removed parts determined to be noise.

Therefore, the robot cleaner can obtain more effective obstacle information.

While exemplary embodiments of the present disclosure have been described in detail above, it will be understood by those skilled in the art that various modifications may be made without departing from the scope of the present disclosure. Therefore, the scope of the present disclosure should not be limited to the described embodiments, and should be determined not only by the claims which will be described later but also by equivalents to the claims.

The invention claimed is:

1. A method for controlling a robot cleaner comprising:
   a map data collecting step of collecting first information acquired when a cleaning target area is photographed by a depth camera and second information acquired when a cleaning target area is photographed by an infrared (IR) sensor;
   a depth data filtering step of removing, from the first information, information determined to be noise when detecting obstacles; and
   a data restoration step of determining whether there is a lost part in information about obstacles by comparing the second information with the information that was determined to be noise and removed in the depth data filtering step, and restoring the lost part when the lost part is present in the information about obstacles,
   wherein the depth camera and the IR sensor simultaneously collect information about the target area while the robot cleaner moves, and
   wherein the depth data filtering step includes:
      a distance comparison step in which, if a difference between an actual position and a reference position corresponding to a distance value where each pixel of the depth camera is detected is a predetermined distance or more, the corresponding information is determined to be noise and removed.

2. The method according to claim 1, wherein the map data collecting step includes:
   collecting the first information and the second information independently of each other.

3. The method according to claim 1, wherein the depth data filtering step includes:
   removing information determined to be noise from the first information using at least one filtering method.

4. The method according to claim 1, wherein the depth data filtering step includes:
   an intensity comparison step in which, when an intensity of information received by each pixel of the depth camera is equal to or less than a predetermined value, the received information is determined to be noise and removed.

5. The method according to claim 1, wherein the depth data filtering step further includes:
   a smoothing step of correcting information of each pixel to an average value of information of pixels not corresponding to noise from among information of peripheral pixels located around each pixel.

6. The method according to claim 1, wherein the depth data filtering step further includes:
   a flying pixel removal step in which, if a distance between each pixel and peripheral pixels thereof is smaller than a predetermined distance, the corresponding information is determined to be valid data.

7. The method according to claim 6, wherein:
   in the flying pixel removal step, the peripheral pixels are pixels that are located closest to each pixel in all directions from each pixel.

8. The method according to claim 7, wherein the flying pixel removal step includes:
   if a distance between each pixel and at least five peripheral pixels from among the peripheral pixels is smaller than a predetermined distance, determining the corresponding information to be valid data.

9. The method according to claim 1, wherein:
   the second information is acquired by:
      extracting feature points from an image photographed by the IR sensor;
      determining corners by interconnecting the feature points; and
      determining information about obstacles by interconnecting corners when the presence of the corners is decided.

10. The method according to claim 9, wherein:
    feature points contained in a region partitioned by the corners are determined to be information about obstacles; and
    feature points located outside the region partitioned by the corners are determined to be noise and removed.

11. The method according to claim 1, further comprising:
    performing the data restoration step after execution of the depth data filtering step.

12. The method according to claim 1, wherein the data restoration step includes:
    when information determined to be noise is removed from the first information, determining whether a discontinuous part is present in the information determined to be noise, and when the presence of the discontinuous part is determined, determining the presence of a lost part in the information determined to be noise.

13. The method according to claim 12, wherein the data restoration step includes:
    when the presence of the discontinuous part is determined, determining whether the discontinuous part from among the second information corresponds to obstacles.

14. The method according to claim 13, wherein the data restoration step includes:
    when the discontinuous part from among the second information corresponds to obstacles, restoring information corresponding to the discontinuous part.

15. A method for controlling a robot cleaner comprising:
    a map data collecting step of collecting first information acquired when a cleaning target area is photographed by a depth camera and second information acquired when a cleaning target area is photographed by an infrared (IR) sensor;

a depth data filtering step of removing, from the first information, information determined to be noise when detecting obstacles; and a data restoration step of determining whether there is a lost part in information about obstacles by comparing the second information with the information that was determined to be noise and removed in the depth data filtering step, and restoring the lost part when the lost part is present in the information about obstacles, wherein the depth camera and the IR sensor simultaneously collect information about the target area while the robot cleaner moves, and wherein the second information is acquired by:
  extracting feature points from an image photographed by the IR sensor;
  determining corners by interconnecting the feature points; and
  determining information about obstacles by interconnecting corners when the presence of the corners is decided.

16. A method for controlling a robot cleaner comprising:

a map data collecting step of collecting first information acquired when a cleaning target area is photographed by a depth camera and second information acquired when a cleaning target area is photographed by an infrared (IR) sensor;

a depth data filtering step of removing, from the first information, information determined to be noise when detecting obstacles; and a data restoration step of determining whether there is a lost part in information about obstacles by comparing the second information with the information that was determined to be noise and removed in the depth data filtering step, and restoring the lost part when the lost part is present in the information about obstacles, wherein the depth camera and the IR sensor simultaneously collect information about the target area while the robot cleaner moves, and wherein the data restoration step includes:
  when information determined to be noise is removed from the first information, determining whether a discontinuous part is present in the information determined to be noise, and when the presence of the discontinuous part is determined, determining the presence of a lost part in the information determined to be noise.

* * * * *